United States Patent
Berman et al.

(10) Patent No.: US 11,368,395 B2
(45) Date of Patent: Jun. 21, 2022

(54) SYSTEM, METHOD AND APPARATUS FOR STORAGE CONTROLLER HAVING MULTIPLE HETEROGENEOUS NETWORK INTERFACE PORTS

(71) Applicant: SUZHOU KUHAN INFORMATION TECHNOLOGIES CO., LTD., Jiangsu (CN)

(72) Inventors: Stuart Berman, Jiangsu (CN); David Crespi, Jiangsu (CN); Kwok Wah Yeung, Jiangsu (CN); Ka Wing Cheung, Jiangsu (CN)

(73) Assignee: SUZHOU KUHAN INFORMATION TECHNOLOGIES CO., LTD., Jiangsu (CN)

( * ) Notice: Subject to any disclaimer, the term of this patent is extended or adjusted under 35 U.S.C. 154(b) by 0 days.

(21) Appl. No.: 17/438,899

(22) PCT Filed: Feb. 21, 2020

(86) PCT No.: PCT/CN2020/076215
§ 371 (c)(1),
(2) Date: Sep. 13, 2021

(87) PCT Pub. No.: WO2020/181977
PCT Pub. Date: Sep. 17, 2020

(65) Prior Publication Data
US 2022/0150164 A1    May 12, 2022

(30) Foreign Application Priority Data
Mar. 13, 2019  (CN) .......................... 201910190265.5

(51) Int. Cl.
*H04L 45/52*    (2022.01)
*H04L 49/25*    (2022.01)
(Continued)

(52) U.S. Cl.
CPC ............ *H04L 45/52* (2013.01); *H04L 45/745* (2013.01); *H04L 49/25* (2013.01); *H04L 69/18* (2013.01)

(58) Field of Classification Search
CPC ....... H04L 45/52; H04L 45/745; H04L 49/25; H04L 69/18
See application file for complete search history.

(56) References Cited

U.S. PATENT DOCUMENTS 6,980,550 B1 * 12/2005 Yip ..................... H04L 67/1002
370/395.32
9,172,641 B2 * 10/2015 Liu ....................... H04L 45/745
(Continued)

FOREIGN PATENT DOCUMENTS

CN      101669082 A      3/2010
CN      102201978 A      9/2011
(Continued)

OTHER PUBLICATIONS

International Search Report (with English translation) and Written Opinion issued in PCT/CN2020/076215, dated May 21, 2020, 9 pages provided.
(Continued)

*Primary Examiner* — Will W Lin
(74) *Attorney, Agent, or Firm* — Hamre, Schumann, Mueller & Larson, P.C.

(57) ABSTRACT

A Multiprotocol Storage Controller (MPSC) System on a Chip (SOC) comprising multiple heterogeneous network interface ports, a switch core, a global memory mapper and a frame router. The interface ports capable of interconnecting networks of devices with differing data and signaling protocols and differing number of data and signal lines.

14 Claims, 5 Drawing Sheets

(51) Int. Cl.
   *H04L 69/18*     (2022.01)
   *H04L 45/745*    (2022.01)

(56) References Cited

U.S. PATENT DOCUMENTS

| | | | |
|---|---|---|---|
| 9,584,632 B2* | 2/2017 | Chakhaiyar | H04L 69/18 |
| 10,764,180 B1* | 9/2020 | Klein | H04L 49/25 |
| 2008/0240093 A1 | 10/2008 | Morad et al. | |
| 2012/0230341 A1 | 9/2012 | Mital et al. | |
| 2017/0034053 A1* | 2/2017 | Chanda | H04L 12/4633 |
| 2017/0070431 A1* | 3/2017 | Nidumolu | H04L 45/741 |
| 2017/0155599 A1* | 6/2017 | Vobbilisetty | H04L 49/25 |
| 2017/0163569 A1* | 6/2017 | Koganti | H04L 12/4633 |
| 2019/0342643 A1* | 11/2019 | Adiletta | H04L 49/00 |
| 2020/0067876 A1* | 2/2020 | Sireling | H04L 61/2061 |

FOREIGN PATENT DOCUMENTS

| | | |
|---|---|---|
| CN | 103152397 A | 6/2013 |
| CN | 106407050 A | 2/2017 |
| CN | 108683659 A | 10/2018 |

OTHER PUBLICATIONS

Office Action issued in corresponding Chinese Application No. 201910190265.5, dated Aug. 20, 2020, with English Abstract.

* cited by examiner

Memory Map Table 900

| Ingress 901 | | | Egress 902 | | |
|---|---|---|---|---|---|
| Interface type or protocol 903 | Memory Start Address 904 | Memory End Address 905 | Interface type or protocol 906 | Mapped Memory Address Start 907 | Mapped Memory Address End 908 |
| NVLink Port 1 909 | 0x00FF0000 910 | 0x00FFFF00 911 | PCIe Port 2 912 | 0x0000FFFF 913 | 0x0001FEFF 914 |
| PCIe Port 2 920 | 0x00010000 921 | 0x0001FFFF 922 | NVLink Port 1 923 | 0xF0000000 924 | 0xF000FFFF 925 |
| PCIe Port 3 930 | 0x000200000 931 | 0x0002FFFF 932 | Ethernet Port 4 933 | 0xD0000000 934 | 0xD000FFFF 935 |
| Ethernet Port 4 940 | 0xD0000000 941 | 0xD000FFFF 942 | PCIe Port 3 943 | 0x000200000 944 | 0x0002FFFF 945 |

Protocol Encapsulation/Decapsulation (PED) Table 1000

| Ingress 901 | | Egress 902 | |
|---|---|---|---|
| Interface type, number and protocol 1001 | Protocol Decapsulation 1002 | Interface type, number and protocol 1003 | Protocol Encapsulation 1004 |
| NVLink Port 1 1010 | N/A 1011 | Ethernet Port 3 1012 | NVMf, RDMA 1013 |
| PCIe Port 2 1020 | N/A 1021 | Ethernet Port 4 1022 | RDMA 1023 |
| Ethernet Port 4 1030 | RDMA 1031 | PCIe Port 2 1032 | N/A 1033 |

FIG. 10

SYSTEM, METHOD AND APPARATUS FOR STORAGE CONTROLLER HAVING MULTIPLE HETEROGENEOUS NETWORK INTERFACE PORTS

FIELD OF THE INVENTION

A multiprotocol storage controller System on a Chip with multiple heterogeneous network interfaces supporting various interface protocols.

BACKGROUND OF THE INVENTION

The amount of data generated in the world is increasing at a very large rate. Current information technology systems, composed of compute, networking and storage elements are challenged to store and act on this data. New standards are being created to move, store and manipulate the data. New components are also being created to manipulate the data in new ways creating entirely new applications and industries. One of these new components is the Graphics Processing Unit (GPU). The GPU was initially created to render three dimensional (3D) graphics, which are comprised of polygons. Offloading graphics processing to high-powered GPUs is what makes modern gaming possible.

While GPUs excel at rendering graphics, the raw power of a GPU can also be used for other purposes. Many operating systems and software programs now support GPGPU, or general-purpose computation on graphics processing units. This can improve the overall performance of a computer or other electric device. New standards have allowed the very high speed interconnect of GPGPUs to result in a system capable of executing a very large number of parallel instructions. Some very important applications have found their way onto GPGPUs and GPGPU networks. These applications include artificial intelligence (AI), machine learning (ML) and accelerated databases among others.

With GPGPUs, new performance bottlenecks have appeared in systems which include them. Since bottlenecks limit the amount of data that can be loaded and unloaded from GPGPUs and networks of GPGPUDs, some applications suffer performance limitations. The problem is exacerbated since the GPGPU interconnect standards are different, and usually higher performance, than compute to GPU interconnect standards. What is needed is a way to move data onto and off of GPGPUs, and any other component which supports a higher speed compute to GPU interface.

BRIEF SUMMARY OF THE INVENTION

Methods, apparatus, systems and products are disclosed for creating the interconnection of differing networks by a multiprotocol storage controller system on a chip.

In one aspect, the system is provided for interconnecting multiprotocol devices with a multiprotocol storage controller (MPSC) system on a chip (SOC). The MPSC SOC comprises at least a switch and a frame router. The system comprises a first device supporting a first protocol and a second device supporting a second protocol, both coupled to the MPSC SOC and the switch and frame router within. The MPSC SOC affects the transfer of data between the first device and the second device. The MPSC SOC can also affect the transfer of data between other supported networks.

In yet another aspect of the invention, a method is provided for forwarding data between two devices supporting two different protocols coupled to a MPSC SOC. The methods consist of receiving data at the MPSC SOC from a first device a first port supporting a first protocol and mapping the address to a second port in the MPSC SOC. The address mapping performed by a Global Memory Mapper comprised of a memory map table.

BRIEF DESCRIPTION OF THE DRAWINGS

The drawings illustrate only exemplary embodiments of the invention and therefore do not limit its scope because the inventive concepts lend themselves to other equally effective embodiments.

FIG. 10 shows the Protocol Encapsulation/Decapsulation table that comprises information on the ingress and egress MPSC SOC protocols. The table provides information so the MPSC SOC can decapsulate received ingress data and encapsulate the egress data with the appropriate protocol.

DETAILED DESCRIPTION OF THE INVENTION

Definitions

Figure 1:
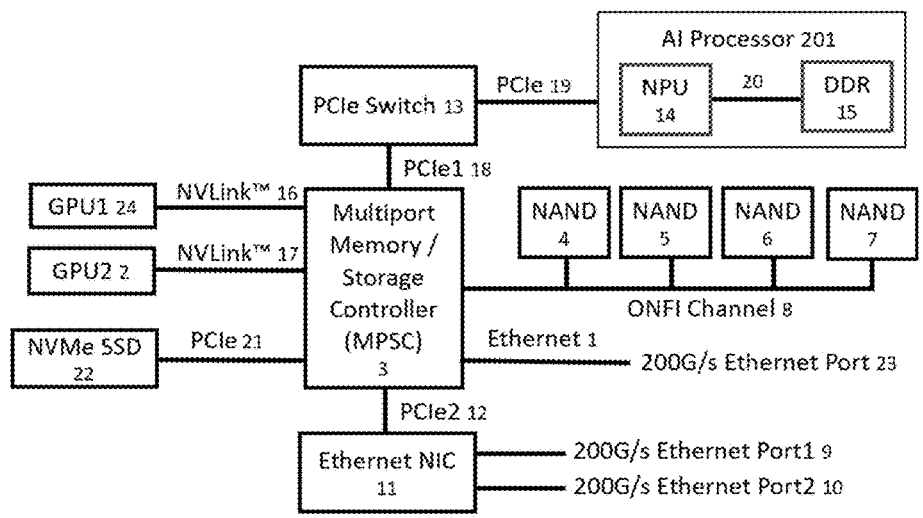
FIG. 1 embodies a Multiprotocol Storage Controller (MPSC) SOC and accompanying components that make up a complete network based storage solution, utilizing both network based storage and local storage connectivity.

AI: Artificial Intelligence
AI-proc: Artificial Intelligence processor
ASIC: Applied Specific Integrated Circuit
CPU: Central Processing Unit
DDR: Double Data Rate Random Access Memory
FC-NVMe: NVMe over Fibre Channel
FIFO: First In First Out
Frame: Refers to a window of bytes or bits in a data packet or from contiguous data
Gen-Z: Generation Z next generation bus
GPGPU: General Purpose Graphics Processing Unit
GPU: Graphics Processing Unit
iWARP: Internet Wide area RDMA protocol
KVS: Key Value Store, object based application programming interface
PCIe: Peripheral Component Interconnect Express
PHY: Physical layer of the OSI model
MAC: Media Access Controller
MPSC: Multiprotocol Storage Controller
NAND: Not-and flash memory, flash memory made up of NAND gates
NIC: Network Interface controller
NPU: May refer to either a Neuron processing unit or a network processor
NVLink™: Nvidia's proprietary inter-GPU link
NVMe: Non-volatile memory express
NVMe-oF: Non-volatile memory express over fabrics, see below definition
NVMf: Non-volatile memory express over fabrics. May refer to NVMe over TCP
NVMe over iWARP, NVMe over RoCE v2 or NVMe over RoCE v1.
NVSwitch™: Nvidia's proprietary switch to interconnect NVLink™ GPU's
ONFI: Open NAND Flash Interface Specification
OpenCAPI: Open Coherent Accelerator Processor Interface
RAM: Random Access Memory
RDMA: Remote direct memory access
RNIC: RDMA Network Interface Controller
RoCE: RDMA over Converged Ethernet
SOC: System on a Chip
SSD: Solid State Storage Device FIG. 1 shows a MPSC SOC 3 and accompanying components that make up a complete network based solution, utilizing both network based storage and local storage connectivity. The MPSC 3 may support zero or more of the following interfaces: GPU NVLink™ 16 17, Non-volatile memory express (NVMe) solid state storage device (SSD) 21, PCIe 12 18, Open NAND Flash Interface Specification (ONFI) 8, Ethernet 1. Each interface 1 8 12 16 17 18 21 is supported by specialized port protocol block logic contained within the MPSC 3. The MPSC 3 is capable of connecting or bridging between two similar or different supported interfaces 1 8 12 16 17 18 21. This allows the combining of very high speed protocols and the speed up of the transfer of data between the protocols. For example, data from a GPU 24 2 can be transferred to an NVMe SSD 22 at a high speed by the MPSC 3. This would allow the loading and storing of data from the GPU to storage without going through a CPU. Another example would be the transferring of data to and from a GPU 24 2 to high speed Ethernet ports 1 9 10 to reach other devices. Still another example would be the high speed transfer of data between GPUs 24 2 and AI processor 201 and storing that data directly to NAND flash devices 4 5 6 7 on an ONFI channel 8. FIG. 1 shows the MPSC 3 directly attached to the GPUs 24 2 NVLink™ 16 17, which is an Nvidia proprietary link created to send data between GPUs at a higher speed than the PCIe interface standard. In this scenario, the MPSC 3 is capable of transfer of data faster than a CPU connected to the GPU PCIe interface utilizing faster interconnect standards.

Figure 2:
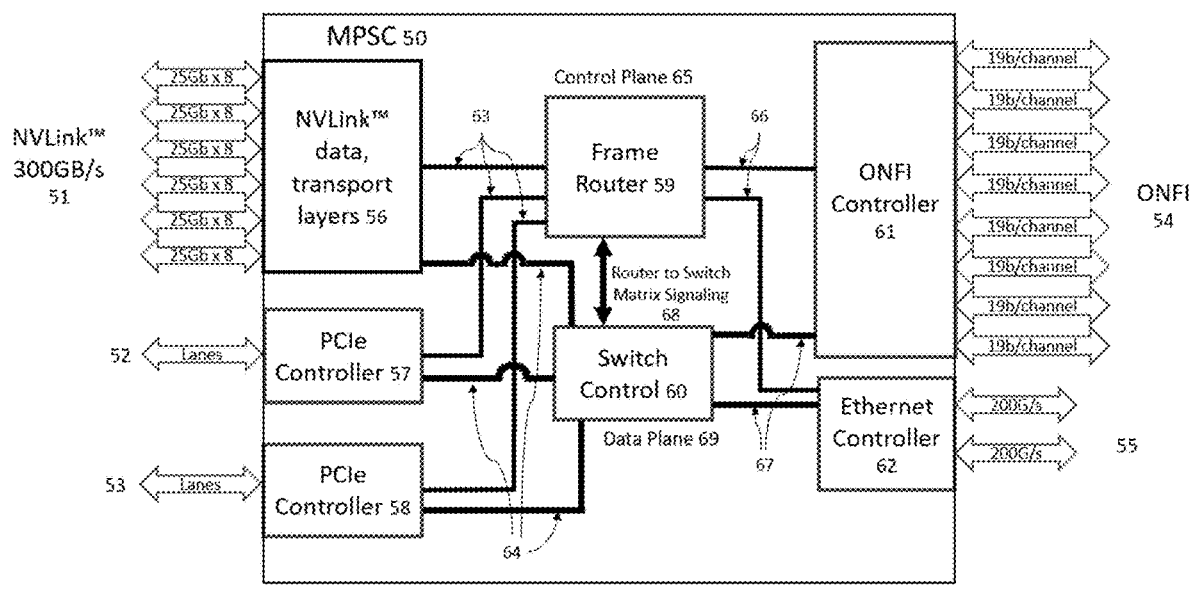
FIG. 2 provides a high level description of one embodiment of the MPSC SOC. The SOC is providing network connectivity with an Nvidia GPU complex via a NVLink™ interface, and can provide, for example, connectivity to an Ethernet interface running a NVMf protocol, a PCIe interface running OpenCAPI, local storage through a ONFI controller or other protocols as configured.

FIG. 2 provides a high level description of one embodiment of the MPSC SOC 50. The MPSC SOC 50 is providing network connectivity with an Nvidia GPU complex via a NVLink™ interface 51, and can provide, for example, connectivity to an Ethernet interface 55 running a NVMf protocol, a PCIe interface 57 58 running OpenCAPI, local storage through a ONFI controller 61 or other protocols as configured. The MPSC SOC 50 is comprised of zero or more of the following blocks: frame router 59, Switch Control 60, ONFI controller 61, Ethernet controller 62, PCIe controller 57 58, NVLink™ controller 56. The frame router 59 performs the Control Plane 65 data forwarding between two different controllers 56 57 58 61 62. The frame router 59 is connected to the controllers through signaling lines 63, 66 so the controllers can signal the frame router than a data frame is ready to be forwarded, identify the type of data frame, and the destination of the data frame and set up the connection 68 through the Switch Control 60. Note that the MPSC SOC register or memory access from external entities is not shown.

The Switch Control 60 is connected 64 67 to each controller 56 57 58 61 62 to affect the transfer of data between the controllers. The Switch Control 60 is also connected 68 to the frame router 59. This connection allows the frame router 59 to signal the Switch Control 60 to identify the source and destination controllers 56 57 58 61 62 to affect the data flow. The ONFI Controller 61 supports the ONFI protocol and supports one or more ONFI channels 54. The NVLink™ controller 56 supports the data and transport layers defined by NVLink™ to connect with other NVLink™ high speed interfaces 51. The PCIe controllers 57 58 support the PCIe transports and optionally support standards which utilize the PCIe signaling such as OpenCAPI and GenZ. The Ethernet controller 62 supports the Ethernet signaling standards and supports connection to Ethernet devices 55. The Ethernet controller 62 also supports various protocols which utilize Ethernet which may comprise one or more of the following, but not limited to: RDMA, RoCE, NVMf. Each controller 56 57 58 61 62 can support differing link speeds and link counts. Shown are example speeds and links. Note that the Switch Control register or memory access from external entities is not shown.

Figures 3, 4, 5:
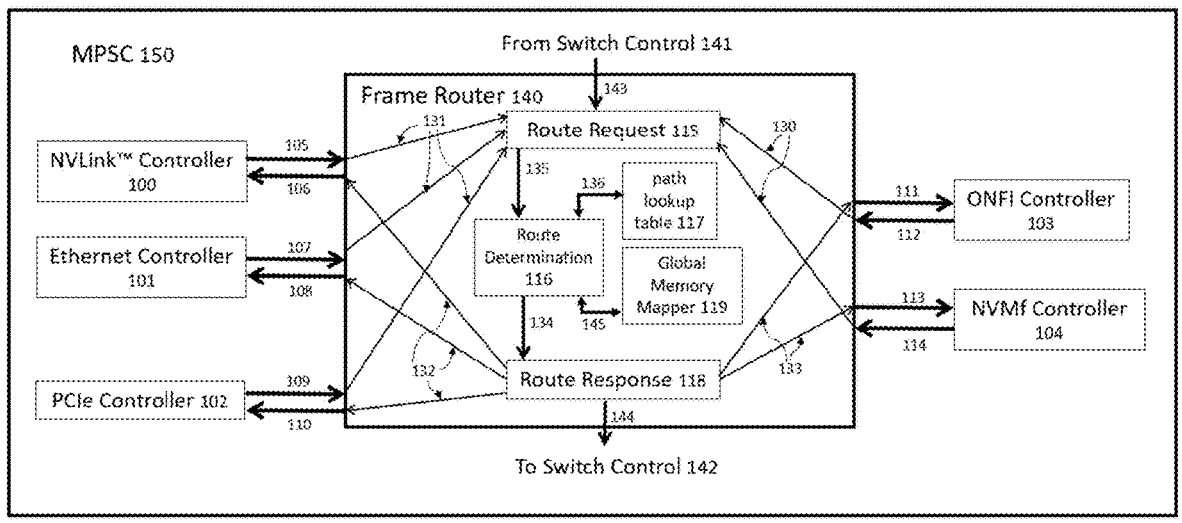
FIG. 3 describes an embodiment of the Frame Router. The Frame Router is used to determine how to expediently move unique traffic, through the MPSC SOC, with minimum latency. Each of the plethora of unique interfaces provides header information to the Frame Router in which the Frame Router uses to build the necessary data paths.
FIG. 4 describes an embodiment of the Switch. The Switch is used to create high speed data paths between unique interfaces. The Switch provides the necessary protocol for the specific interface, which may or may not include encapsulation/de-capsulation of data. The Switch is aware of the global address space with the use of a programmable Global Memory Mapper function.
FIG. 5 describes the management/configuration interface, which in one embodiment includes registers that control the MPSC SOC functions through the use of a Management CPU.

FIG. 3 describes an embodiment of the Frame Router 140 within the MPSC 150. The Frame Router 140 is used to determine how to move traffic from each source controller 100 101 102 103 104 to each destination controller 100 101 102 103 104, through the MPSC SOC 150, with minimum latency and maximum efficiency. The Frame Router 140 comprises the following functional blocks: route request 115, route determination 116, path lookup table 117, route response 118, Global Memory mapper 119. The Frame Router 140 is coupled externally to the Switch Control 141 142 and the port protocol blocks 100 101 102 103 104. Each of the port protocol blocks 100 101 102 103 104 are connected to the Frame Router through signal lines 105 106 107 108 109 110 111 112 113 114. The signal lines provide one or more of the following functions: frame header information, source port protocol block number, port protocol block protocol identification, port protocol block protocol state, route request signal, route response signal, frame content information, frame priority information, frame address information. Note that the Frame Router register or memory access from external entities is not shown.

The Route Request functional block 115 is coupled 143 135 to the Switch Control 141, the Route Determination block 116 and the port protocol block request signal lines 130 131. The Route Request block 115 reads route requests and their associated information and creates a route determination signal vector 135. The Route Determination signal vector 135 may comprise one or more of the following information fields: source controller, frame to switch header or portions of the header, congestion information from the controller, priority information from the controller. The Route Determination block 116 is coupled 136 to the path lookup table 117 which includes additional information to determine the route, which may comprise one or more of the following: protocol specific information based on the port protocol block, information about how to connect two different port protocol block protocols, route information based on the type of frame.

The path lookup table 117 determines from the route request which destination port protocol controller to route the ingress port controller requested data. The path lookup table 117 may comprise registers or memory with ingress and egress port protocol block pairs for static data forwarding. The Global Memory Mapper 119 is coupled 145 to the Route Determination block 116. The Global Memory Mapper 119 receives information about the ingress port protocol block and incoming frame. The Global Memory Mapper 119 may perform some address mapping which is passed to the Route Determination block 116. The Route Determination block 116 may forward the received information from the Global Memory Mapper 119 to the Route Response Block 118 which may in turn forward 144 the information to the Switch Control 142.

The Route Response block 118 is coupled 134 144 to the Route Determination block 116, the Switch Core 142 and to each 132 133 port protocol block 100 101 102 103 104. The Route Response block 118 signals 144 the Switch Control 142 to build a source and destination path to the specific port protocol blocks 100 101 102 103 104 and signals the source and destination controllers that the switch path is completed.

FIG. 4 describes an embodiment of the Switch Control 260 within the MPSC 280. The Switch Control 260 is used to create high speed data paths between unique interfaces port protocol blocks 200 201 202 203 204. The Switch Control 260 provides the necessary protocol and buffering for the specific interface, which may or may not include encapsulation/de-capsulation of data 205 206 207 208 209. The Switch Control 260 comprises one or more of the following functional blocks: Switch Controller 210, Switch Matrix Buffer 211, Protocol encapsulation (encap), decapsulation (decap) and memory buffer 205 206 207 208 209. The Switch Controller 210 is coupled to 230 231 232 the Frame Router FIG. 3 140 and to the Switch Matrix Buffer 211. The Switch Controller 210 signals 255 the Switch Matrix Buffer 211 to create a data path 256 257 258 259 261 262 between two port protocol blocks 205 206 207 208 209. The Switch Matrix Buffer 211 may comprise one of the following: multi-ported memory switch, switch composed of multiplexors, asynchronous switch.

The Switch Control 260 also comprises one or more Port Protocol Blocks comprising protocol encap/decap and memory buffer elements 205 206 207 208 209. The protocol encap/decap function allows the transfer of data between networks with two different framing protocols. Generally, a frame with a first protocol is received, the protocol, may be the header, footer or other parts, is removed and a second protocol, which may include a header, footer or other parts, is added to the frame. Usually this requires the buffering of one or more portions of the frame. The Port Protocol blocks 205 206 207 208 209 are coupled 256 257 258 259 261 262 to the switch matrix buffer 211 and to the 220 221 222 223 224 225 226 227 228 229 port protocol blocks 200 201 202 203 204.

FIG. 5 contains an embodiment of the management interface used for configuration and monitoring of the MPSC 510. The MPSC 510 is controlled by a CPU 512 over a PCIe 511 Interface. The MPSC 510 is set up and controlled by a group of registers called the System Block Configuration Registers 500. The Frame Router Registers 501, the Switch Control Registers 502 and the Port Protocol Block Registers are used to configure the Frame Router, the Switch and the Ports respectively of the MPSC 510, and all provide status and error information back to the CPU 512. The CPU 512 accesses system memory by the System Ram Interface 504.

Figure 6:
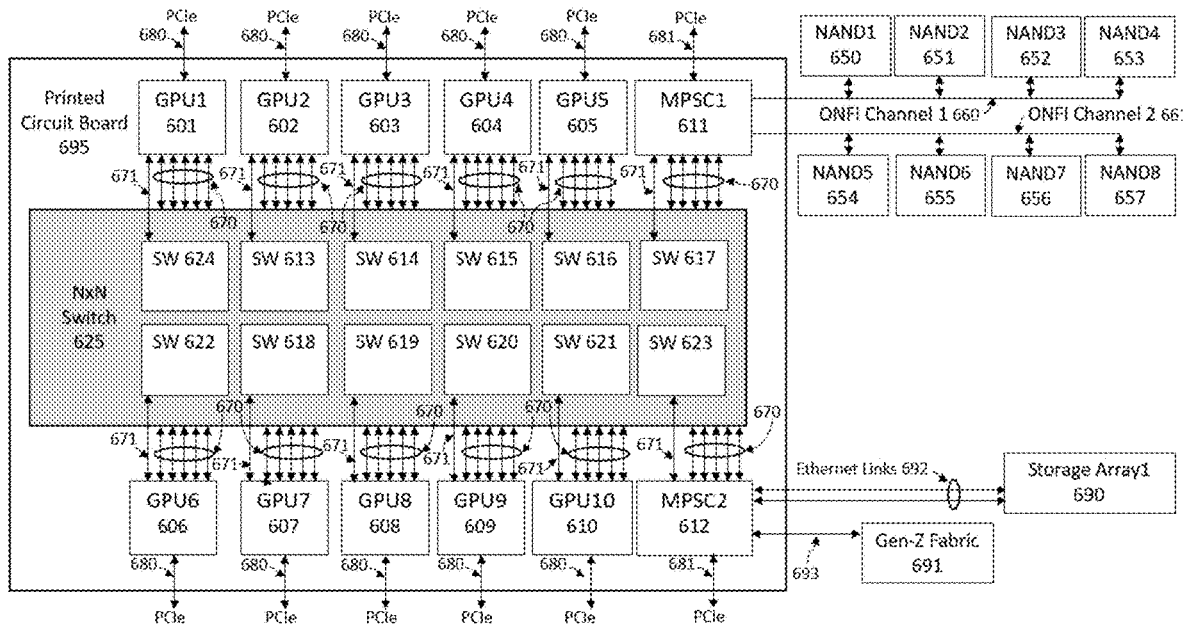
FIG. 6 provides an embodiment of the MPSC SOC being utilized within a Nvidia GPU complex, connecting directly to the NVLink™ interface of an NVSwitch™ complex. This embodiment includes local flash memory, as controlled by one instantiation of the MPSC SOC and NVLink™. A second instantiation of the MPSO SOC is connected to the NVLink™ on one interface, and to both an Ethernet interface running a NVMf protocol, and a second PCIe interface, running a Gen-Z protocol.

FIG. 6 contains an embodiment of the MPSC1 611 and MPSC2 612 being used on a printed circuit board 695 that are providing both internal and external access to storage to a GPU complex. This complex is comprised of GPU1 through GPU10 601-610, an N×N crossbar Switch 625, comprising 12 18×18 switches SW613-SW624 and MPSC1 611 and MPSC2 612. Each of the GPU's has a high speed connection 671 to the switch attached directly below it, as well as to the remaining 5 switches that reside on the same side through additional high speed interfaces 670. Each of the switches are connected directly across to a switch chip directly below it. Each of the devices also supports a PCIe interface 680 681 for configuration and control. MPSC1 611 is used to provide high speed access to local storage by providing connectivity into the GPU complex over a number of high speed interfaces 670 671 and to local NAND flash 650-657 through a number of ONIF channels 660 661.

MPSC2 612 is used to provide high speed access to remote storage by providing connectivity into the GPU complex over a number of high speed interfaces 670 671 and to an external Storage Array1 690, over a number of Ethernet Links 692 while using a storage protocol like NVMf. MPSC2 612 additionally provides connectivity to a local coherent Gen-Z Fabric 691 over a second high speed interface 693. MPSC1 611 and MPSC2 612 are shown to interconnect a number of high speed protocols and networks in the diagram but the invention is not limited to the elements shown.

Figure 7:
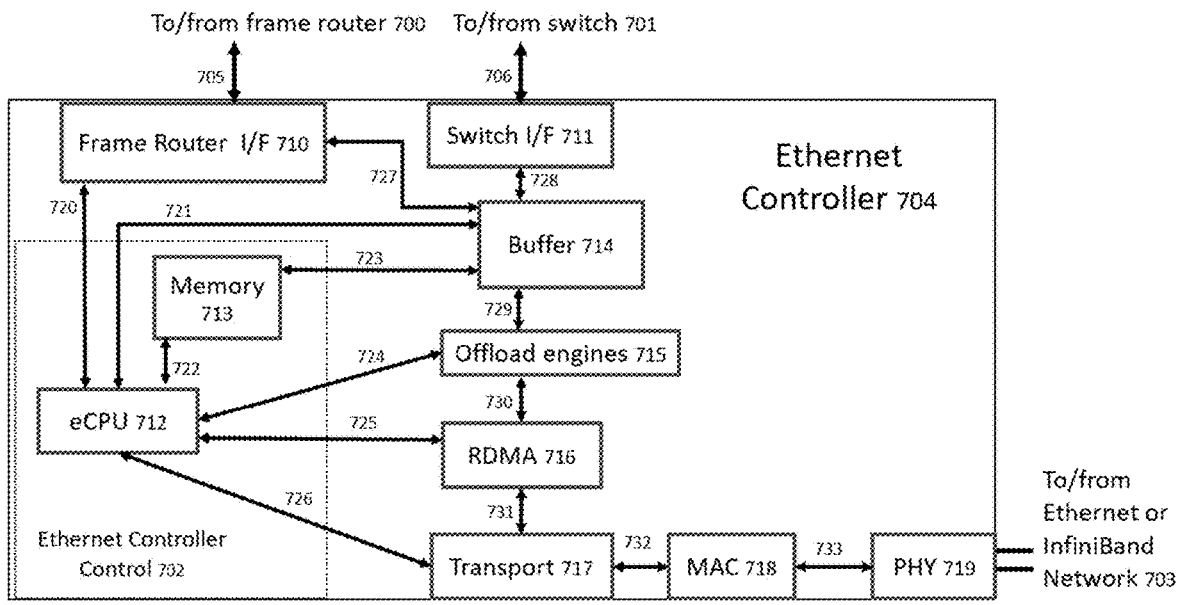
FIG. 7 provides an embodiment of the Ethernet Controller. The Ethernet Controller provides the specific Ethernet interface and the connectivity to the Frame Router and the Switch interfaces. This controller provides the RDMA and offload engines needed for today's high performance networks and is managed by a CPU.

FIG. 7 contains an embodiment of the Ethernet Controller 704 that is used to provide network connectivity to other MPSC's or network devices over high speed Ethernet links 703. The Ethernet Controller 704 is comprised of a Phy 719, a MAC 718, a Transport 717, RDMA 716 assist, Offload engines 715, a Buffer 714, a Switch I/F 711, a Frame Router I/F 710 and an Ethernet Controller Control 702.

The Ethernet Controller 704 is configured and managed by the Ethernet Controller Control 702, which is comprised of an eCPU 712 and Memory 713, which may or may not be local to the Ethernet Controller 704. The eCPU 712 has access to all the blocks within the controller over control and data paths 720-726.

The Frame Router I/F 710 provides specific control information to the Frame Router about the ingress data coming into the MPSC, and destined to some other interface, and controls the flow egress data leaving the MPSC. The Switch I/F 711 provides data path connectivity to/from the Switch Matrix Buffer.

The Buffer 714 is a FIFO memory used for data smoothing into and out of the MPSC Switch Matrix Buffer.

The Offload engines 715 are used to provide hardware assist on the data coming into and out of the MPSC. The particular assist is configured by the eCPU 712 over an interface 724, which may include CRC calculations and checks, T10 DIF checks, compression, encryption etc.

The RDMA 716 controller is used to provide hardware assist to some number "N" external RDMA connections. Once the RDMA conversation is set up, via the eCPU 712 over interface 725, the RDMA 716 controller provides the full hardware support for control and data movement.

The Transport 717, MAC 718 and PHY 719 all work together to provide the necessary connectivity to another Ethernet device (i.e. configuration of the number of interfaces used for the connection, speed of the interface, the particular Transport which may comprise one or more of the following: RDMA, RoCEv2, UDP, TCP, etc). These blocks are configured with the eCPU 712 over an interface 726. Although an Ethernet controller is described, an InfiniBand controller can easily be substituted.

The Ethernet Controller 704 may perform encapsulation and decapsulation of Ethernet frames sent and received, respectively, over the Ethernet interface 703. In one aspect, an incoming data packet from another MPSC interface, such as the PCIe interface, contains address spaces and transaction types, such as memory or I/O read and write. The Ethernet Controller 704 may encapsulate the PCIe address spaces and transaction types in another protocol, such as RDMA, after the address from the PCIe packet is mapped by the global memory mapper, FIG. 3 119. The result is the transmission of an Ethernet frame comprising the read or write command from the original PCIe data, the address from the PCIe packet mapped to the address range of the entity coupled to the Ethernet network 703 along with optional data if the transaction type is a PCIe write.

Figures 8, 9:
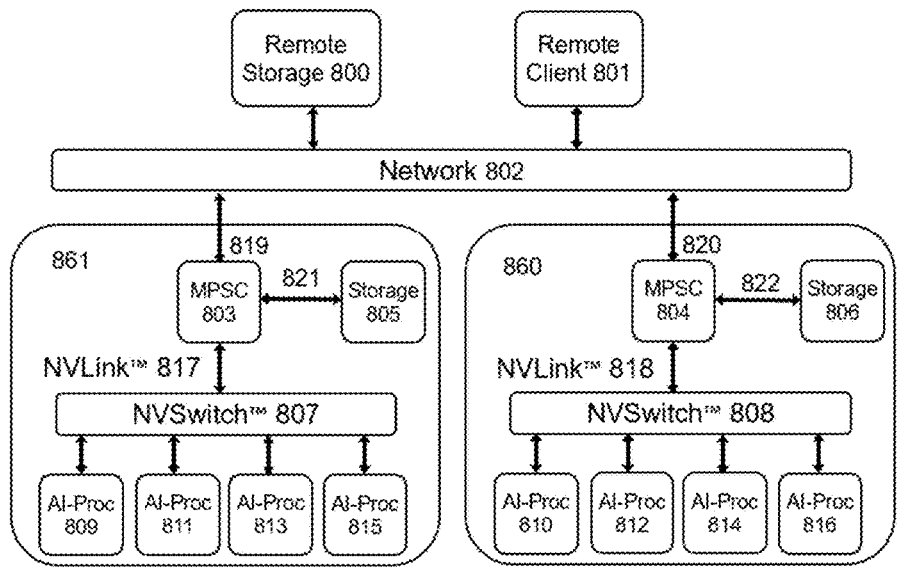
FIG. 8 provides an embodiment of the MPSC SOC providing multiport storage connectivity using a network interface that provides connectivity to remote storage, as well as connectivity to other MPSC based systems. The MPSC SOC is additionally connected to a NVSwitch™ complex, and to local storage.
FIG. 9 shows the Global Memory Mapper table that maps addresses from the ingress port to the egress port. Both ports may support different protocols and/or protocol encapsulations.

FIG. 8 contains an embodiment of the MPSC 803 804 being used in a GPU system 860 861 communicating through a Network 802 over their respective interfaces 819 820, that connects to Remote Storage 800 and Remote Clients 801 on one side, and to local storage 805 806 over a high speed interface 821 822 and to a NVSwitch™ 807 808 using a high speed NVLink™ interface 817 818, which provides the data to the GPU's 809-816.

FIG. 9 shows the Address Map Table 900 within the Global Memory Mapper functional block, FIG. 3 119. The Address Map Table 900 maps addresses from an MPSC SOC ingress port to the egress port, FIG. 1, 8 12 16 17 18 21. Both ports may support different protocols and/or protocol encapsulations, FIG. 2 56 57 58 61 62. The Global Memory Mapper FIG. 3 119 maps data from one ingress port protocol to another egress port protocol. The Global Memory Mapper FIG. 3 119 is coupled with the Switch Controller and each supported port protocol block FIG. 4 205 206 207 208 209. The Global Memory mapper FIG. 3 119 reads the ingress port protocol and maps the received address. The Global Memory Mapper FIG. 3 119 comprises a Memory Map Table FIG. 9 900 which comprises one or more of the following elements: Ingress Interface type or protocol 903, Memory Start Address 904, Memory End Address 905, Egress Interface type or protocol 906, Mapped Memory Address Start 907, Mapped Memory Address End 908. The Memory Map Table 900 is used to map the address space from ingress based data and ports to egress addressing and ports.

The MPSC SOC may optionally map the address from the ingress port to the egress port. The memory translation algorithm starts when the Global Memory Mapper FIG. 3 119 is signaled that data is received from an ingress port. The address from the incoming frame is read by the Global Memory Mapper FIG. 3 119. The ingress address may be checked with the Memory End Address 905 value in the Memory Map Table FIG. 9 90 that it is a valid and inbounds address. An offset from the ingress start memory address is calculated by using the Memory Map Table 900 Ingress Interface type or protocol table location 903 along with the Memory Start Address table location 904. The offset is calculated by subtracting the received ingress frame address from the Memory Map Table 900 Memory Start Address 904 for this Interface type or protocol 903. The offset is then added to the egress Mapped Memory Address Start table location 907. The resulting address may be then checked for out of bounds conditions using the egress Mapped Memory Address End table location 908. The result is an address that is mapped from an ingress address range to an egress address range.

FIG. 10 shows the Protocol Encapsulation/Decapsulation (PED) Table 1000. The table may be located in the specific Protocol Controllers FIG. 3 100 101 102 103 104, the Switch Control FIG. 4 260 Protocol encapsulation/decapsulation buffers 205 206 207 208 209, or in the Frame Router FIG. 3 140. The PED Table 1000 can be located in the specific Protocol Controllers such as the Ethernet Controller FIG. 3 101 FIG. 4 201 204. If the PED Table 1000 is located in the Ethernet Controller FIG. 7 704 the table lookup and protocol encapsulation/decapsulation may be implemented in software by the eCPU 712 or in hardware by the Offload Engines 715. The PED Table 1000, contains both ingress and egress information, which may comprise: port number, ingress protocol, egress protocol. Incoming data from the Ethernet link FIG. 7 703 may comprise one or more of the following Ethernet frame fields: MAC address, RDMA address, IP address, TCP address, UDP address. The PED Table 1000 shows three rows, the first 1010 1011 1012 1013, the second 1020 1021 1022 1023, the third 1030 1031 1032 1033. Once enough of the Ethernet frame is received, a lookup of the PED Table 1000 occurs to determine the specific table row. Once the PED Table 1000 row is selected, the specific egress columns in the row determine the protocol encapsulation. The data is then forwarded to the egress port using the Frame Router FIG. 3 140 and the Switch Control FIG. 4 260. The NA's 1011 1021 0133 specify 'not applicable'. Note that the PED Table, encapsulation and decapsulation functions can be centralized or distributed.

Although the foregoing invention has been described in some detail by way of illustration and example for purposes of clarity and understanding, it may be readily apparent to those of ordinary skill in the art in light of teachings of this invention that certain changes and modifications may be made thereto without departing from the spirit or scope of the appended claims

We claim:

1. A system for interconnecting multiple devices via a multiprotocol system, comprising:
 a multiprotocol System On Chip (SOC),
 a switch core, the switch core creating data paths between attached devices, a first port protocol block and a second port protocol block, each protocol block comprising
a memory buffer for incoming data and outgoing data, protocol encapsulation and decapsulation functions,
the first port protocol block and the second port protocol block coupled to the switch core,
a global memory mapper, the global memory mapper coupled to the switch core and coupled to the first port protocol block and the second port protocol block,
the global memory mapper, comprising:
an address mapping table, the address mapping table comprising:
one or more rows in the table, wherein each of the rows comprises:
an ingress protocol,
an ingress start memory address, and
an egress start memory address,
a first device coupled to the multiprotocol SOC,
a second device coupled to the multiprotocol SOC,
whereby the first device sends data to the first port protocol block of the multiprotocol SOC, the first port protocol block sends a first address of the data to the global memory mapper, the global memory mapper calculates a second address using the offset of the first address relative to the ingress start memory address and the egress start memory address corresponding to the second port protocol block, the global memory mapper sends the second address to the second port protocol block, the second port protocol block sends the data to the second device according to the second address, the protocol supported by the first port protocol block is different from the protocol supported by the second port protocol block.

2. The system of claim 1 whereby each protocol block supports one of the following interfaces: NVLink, PCIe, Ethernet, RDMA, RoCE v2, RoCE v1, InfiniBand, OpenCAPI, Gen-Z, iWARP, FC-NVMe, ONFI.

3. The system of claim 1 whereby the address mapping table comprises one or more of the following: ingress memory stop address, egress memory stop address, egress protocol type, egress protocol information, ingress memory start address, egress memory start address, ingress protocol information.

4. The system of claim 1 whereby the multiprotocol system is contained within a single ASIC.

5. An apparatus for interconnecting multiple devices via a multiprotocol system, comprising:
a switch core, the switch core creating data paths between attached devices,
a first port protocol block and a second port protocol block, each protocol block comprising
a memory buffer for incoming data and outgoing data, protocol encapsulation and decapsulation functions,
the first port protocol block and the second port protocol block coupled to the switch core,
a global memory mapper, the global memory mapper coupled to the switch core and coupled to the first port protocol block and the second port protocol block,
the global memory mapper, comprising:
an address mapping table, the address mapping table comprising:
one or more rows in the table, wherein each of the rows comprises:
an ingress protocol,
an ingress start memory address, and
an egress start memory address,
whereby data is received by the first port protocol block, the first port protocol block sends the address of the data to the global memory mapper, the global memory mapper looks up the address in the address mapping table, the global memory mapper calculates the address for the second port protocol block, the global memory mapper sends the newly calculated address to the second port protocol block, the protocol supported by the first port protocol block is different from the protocol supported by the second port protocol block.

6. The system of claim 5, whereby each protocol block supports one of the following interfaces: NVLink, PCIe, Ethernet, RDMA, RoCE v2, RoCE v1, InfiniBand, OpenCAPI, Gen-Z, iWARP, FC-NVMe, ONFI.

7. The system of claim 5, whereby the address mapping table comprising one or more of the following: ingress memory stop address, egress memory stop address, egress protocol type, egress protocol information.

8. The system of claim 5, whereby the multiprotocol system is contained within a single ASIC.

9. A method for transferring data between at least a first device coupled to a first port protocol block in a Multiprotocol Storage Controller (MPSC) System On Chip (SOC) to a second device coupled to a second port protocol block in the MPSC SOC, the MPSC SOC comprising at least a switch controller, the first port protocol block and the second port protocol block and a global memory mapper, the method comprising:
receiving data from said first device to the first port protocol block;
mapping an address from the incoming data in the first protocol block to an address for the second port protocol block by the global memory mapper; and
sending the data with the newly mapped address to said second device by the second port protocol block,
wherein the protocol supported by the first port protocol block is different from the protocol supported by the second port protocol block,
wherein each of the first port protocol block and the second port protocol block comprises:
a memory buffer for incoming data and outgoing data;
protocol encapsulation and decapsulation functions, and
wherein the global memory mapper comprises:
an address mapping table, the address mapping table comprising:
one or more rows in the table, wherein each of the rows comprising:
an ingress protocol;
an ingress start memory address; and
an egress start memory address.

10. The method of claim 9 wherein the MPSC SOC transfers data between two or more of the following interfaces: NVLink™, PCIe, Ethernet, RDMA, RoCE v2, RoCE v1, InfiniBand, OpenCAPI, Gen-Z, iWARP, FC-NVMe, ONFI.

11. A system for interconnecting storage and networking devices via a multiprotocol switching system, comprising:
a switch core, the switch core creating data paths between attached devices,
a first port protocol block and a second port protocol block, each protocol block comprising
a memory buffer for incoming data and outgoing data, protocol encapsulation and decapsulation functions,
the first port protocol block and the second port protocol block coupled to the switch core,
a register or memory table, comprising:

ingress information, which comprise one or more of the following:
 ingress port number, ingress port identification, ingress port protocol, egress information which comprise one or more of the following:
 egress port number, egress port identification, egress port protocol for protocol encapsulation, egress interface type,
the register or memory table coupled to the first port protocol block and the second port protocol block,
a first networking device coupled to the multiprotocol switching system,
a second storage device coupled to the multiprotocol switching system,
whereby the first networking device sends data to the first port protocol block of the multiprotocol switching system, the first port protocol block decapsulates a first networking protocol, the resulting data is switched to the second port protocol block, the second port protocol block encapsulates the data into the protocol supported in the second port protocol block and the data is sent out the egress port, the protocol supported by the first port protocol block is different from the protocol supported by the second port protocol block.

12. The system of claim 11 whereby the networking protocol comprises one or more of the following: InfiniBand, Ethernet, RDMA, TCP, IP, Fibre Channel, NVMe over Fibre Channel, NVMe over TCP, iWARP, NVLink and the storage protocol comprises one or more of the following: ONFI, PCIe, PCIe NVMe, OpenCAPI, Gen-Z, KVS.

13. A method for interconnecting storage and networking devices via a multiprotocol switching system, comprising:
 a switch core, the switch core creating data paths between attached devices,
 a first port protocol block and a second port protocol block, each protocol block comprising
 a memory buffer for incoming data and outgoing data, protocol encapsulation and decapsulation functions,
 the first port protocol block and the second port protocol block coupled to the switch core,
 a register or memory table, comprising:
 ingress information, which comprise one or more of the following:
 ingress port number, ingress port identification, ingress port protocol, egress information which comprise one or more of the following:
 egress port number, egress port identification, egress port protocol for protocol encapsulation, egress interface type,
 the register or memory table coupled to the first port protocol block and the second port protocol block,
 a first networking device coupled to the multiprotocol switching system,
 a second storage device coupled to the multiprotocol switching system,
 whereby the multiprotocol switching system (MPSC) receives a frame from the first networking device coupled to the first port, the networking protocol is removed from the incoming frame, the frame is sent through the switch core to the second port protocol block, the second port protocol block encapsulates the frame into a storage protocol, the frame is transmitted out the second port to the second storage device, the protocol supported by the first port protocol block is different from the protocol supported by the second port protocol block.

14. The method of claim 13 whereby the networking protocol may comprise one or more of the following: InfiniBand, Ethernet, RDMA, TCP, IP, Fibre Channel, NVMe over Fibre Channel, NVMe over TCP, iWARP, NVLink and the storage protocol comprises one or more of the following: ONFI, PCIe, PCIe NVMe, OpenCAPI, Gen-Z, KVS.

* * * * *